(12) United States Patent
Smith

(10) Patent No.: US 7,703,713 B2
(45) Date of Patent: Apr. 27, 2010

(54) ADJUSTABLE BLADES FOR WOOD CHIPPERS AND METHOD

(76) Inventor: Paul M. Smith, 387 N. 5th St., Timpson, TX (US) 75975

( * ) Notice: Subject to any disclaimer, the term of this patent is extended or adjusted under 35 U.S.C. 154(b) by 747 days.

(21) Appl. No.: 11/451,537

(22) Filed: Jun. 12, 2006

(65) Prior Publication Data

US 2006/0283303 A1    Dec. 21, 2006

Related U.S. Application Data

(60) Provisional application No. 60/690,561, filed on Jun. 15, 2005.

(51) Int. Cl.
*B02C 1/08* (2006.01)
*B02C 7/00* (2006.01)
*B02C 13/00* (2006.01)

(52) U.S. Cl. .............. 241/242; 241/286; 241/294; 144/162.1; 144/220; 144/230

(58) Field of Classification Search .......... 241/294, 241/286, 242; 144/162.1, 230, 241, 220; 407/45–47, 113
See application file for complete search history.

(56) References Cited

U.S. PATENT DOCUMENTS

| | | | | |
|---|---|---|---|---|
| 653,856 | A | * | 7/1900 | Ryzin ................ 241/294 |
| 717,718 | A | * | 1/1903 | Saecker .............. 241/294 |
| 942,746 | A | * | 12/1909 | Rankin et al. ........ 241/294 |
| 1,702,633 | A | * | 2/1929 | Feeley ............... 241/294 |
| 2,652,869 | A | * | 9/1953 | Goodman et al. ...... 144/241 |
| 3,777,793 | A | * | 12/1973 | Miller ............... 144/220 |
| 4,082,127 | A | * | 4/1978 | Miller ............... 144/220 |
| 4,444,233 | A | * | 4/1984 | Miller ............... 144/220 |
| 5,511,597 | A | | 4/1996 | Shantie et al. ....... 144/220 |
| 5,819,826 | A | | 10/1998 | Schmatjen ........... 144/241 |
| 5,820,042 | A | | 10/1998 | Robison ............. 241/92 |
| RE36,659 | E | | 4/2000 | Toogood ............. 144/220 |
| 6,662,837 | B2 | | 12/2003 | Smith ............... 144/241 |

* cited by examiner

*Primary Examiner*—Bena Miller
(74) *Attorney, Agent, or Firm*—John M. Harrison

(57) ABSTRACT

Adjustable blades for wood chippers and cutters include one or more blades of selected length, thickness and width, fitted with one or more bevelled blade seats in the rear blade edge, which blade seats, in a first embodiment, receive corresponding bevelled inserts having threaded openings fitted with an insert mount screw and a pair of adjusting screws. The mount screws serve to seat the inserts firmly in the blade seats and reverse-manipulation of the adjusting screws in the inserts provides adjustment of the fit of the adjustable blades in a cutting or chipping head, to compensate for re-sharpening of the blades. A method for adjusting the fit of wood cutter and chipper blades in a cutting or chipping head, which includes the steps of providing one or more bevelled insert seats in the rear edge of the blades opposite the cutting edge; placing a correspondingly-shaped bevelled insert in the insert seat or seats; threading an insert mount screw and a pair of adjusting screws through the insert; tightening the insert mount screw against the blade in the insert seat or seats and reverse-manipulating the adjusting screws to extend the adjusting screws from the insert to fit the blades in a chipping or cutting head. In a second embodiment heated babitt metal is poured into a mold receiving the adjustable blades and fills the bevelled blade seat or seats. The liquified babitt metal flows rearwardly of the blade in the mold to solidify and define a babitt extension of selected width that compensates for metal lost in the blade-sharpening operation.

9 Claims, 3 Drawing Sheets

ADJUSTABLE BLADES FOR WOOD CHIPPERS AND METHOD

CROSS-REFERENCE TO RELATED APPLICATIONS

This application claims the benefit of and incorporates by reference U.S. Provisonal Application Ser. No. 60/690,561, Filed Jun. 15, 2005.

SUMMARY OF THE INVENTION

This invention relates to wood cutters and chippers such as log slabbers and canters and typically, to single-edge wood chipper blades for brush chippers, which blades can be repeatedly removed from a wood chipper and sharpened as needed to prevent the need for disposing of multiple conventional blades over long periods of repeated use. Each of the adjustable blades typically engages a blade mount base removably engaging a rotary cutting or chipping head and a companion clamp plate for engaging the plate blade mount base and the adjustable blade is typically interposed between the blade mount base and the clamp plate. A blade edge is shaped in the front end of the blade body and extends from between the blade mount base and the clamp plate. In a preferred embodiment one or more bevelled insert seats are shaped in the rear edge of the blade body opposite the blade cutting edge and correspondingly-shaped bevelled inserts are seated in the insert seats, respectively. An insert mount screw is threaded through each insert, along with a pair of adjusting screws, such that the insert mount screw can be tightened against the blade base in each insert seat, thus stabilizing the insert in place. The adjusting screws can then be loosened and extended or reverse-manipulated a selected distance from the plane of the insert and the rear edge of the blade to compensate for metal lost along the cutting edge of the blade due to re-sharpening. Accordingly, the blade body can be quickly, easily and repeatedly removed from between the blade mount base and the clamp blade and sharpened, and the adjusting screws then threadably adjusted rearwardly to compensate for the metal lost along the sharpened edge. The blade can then be again snugly secured in place between the blade mount base and the clamp plate in the cutting or chipping head, for optimum and economical operation of the chipper or other cutting apparatus over a long period of time.

In another embodiment of the invention the blades are placed in a mold of selected size and melted babitt metal is poured into the insert seats and extends rearwardly of the rear edge of each blade a selected distance which is determined by the mold dimensions, to compensate for the metal removed along the blade cutting edge during the blade-sharpening process.

BRIEF DESCRIPTION OF THE DRAWINGS

The invention will be better understood by reference to the accompanying drawings wherein.

DESCRIPTION OF THE PREFERRED EMBODIMENTS

Figure 1:
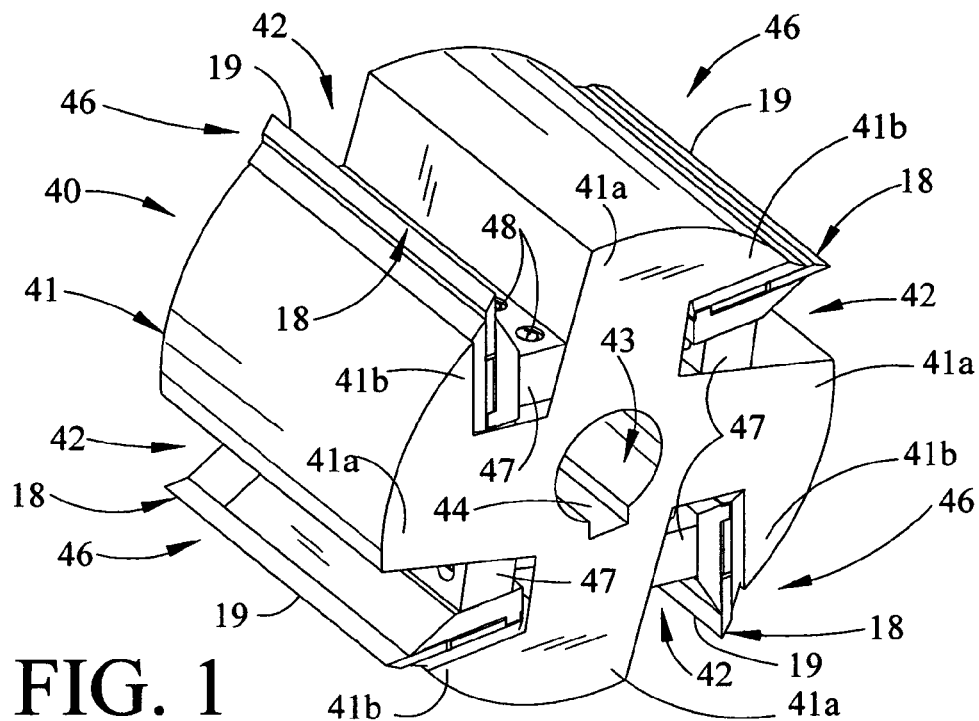
FIG. 1 is a perspective view of a typical chipping head for a brush chipper, with the adjustable blades of this invention mounted on the chipping head.
Figure 2:
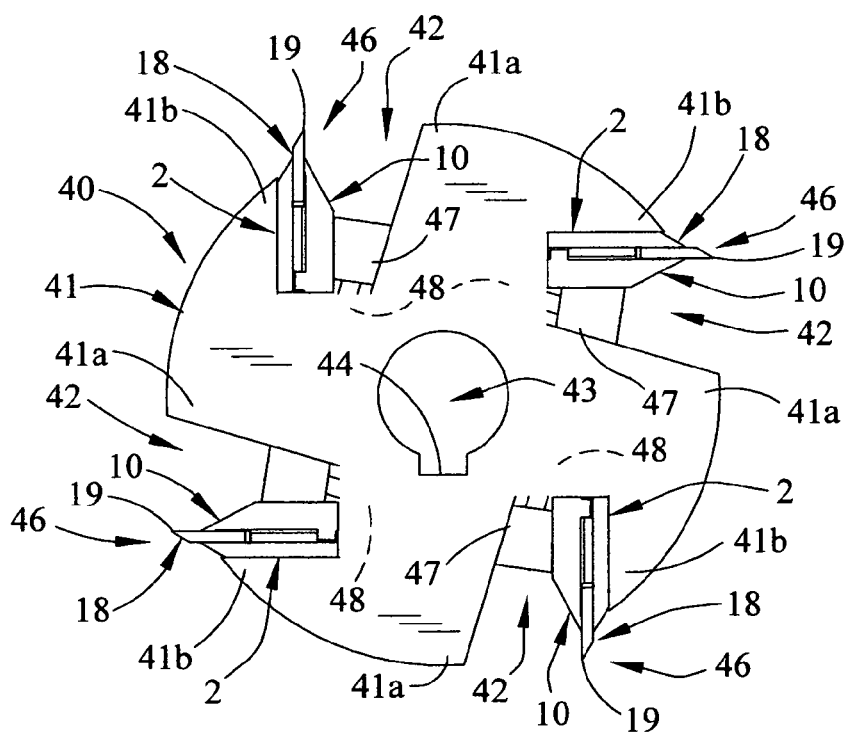
FIG. 2 is a side view of the brush chipper, chipping head and adjustable blades illustrated in FIG. 1.
Figure 3:
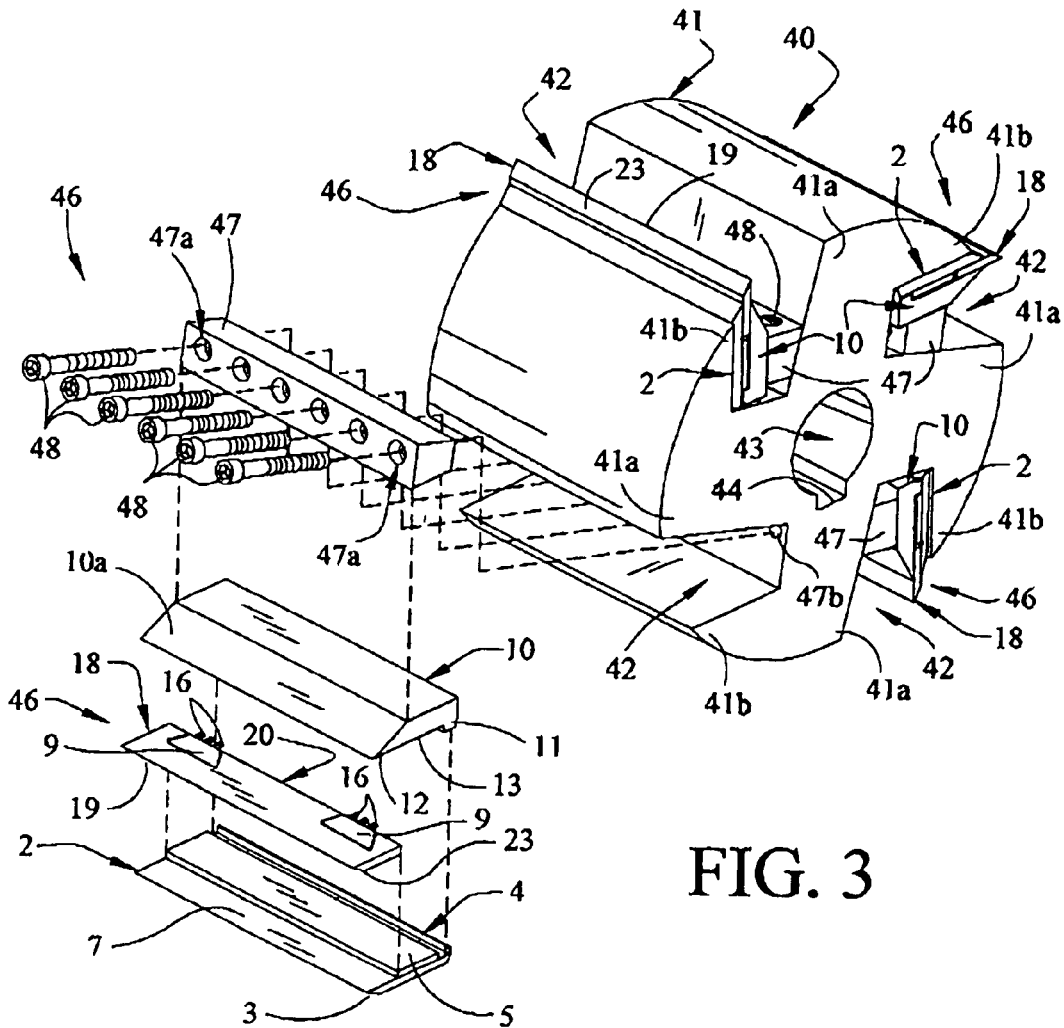
FIG. 3 is an exploded view of the brush chipping head illustrated in FIGS. 1 and 2, illustrating a typical wedge component for mounting the adjustable blades on the chipping head.
Figure 4:
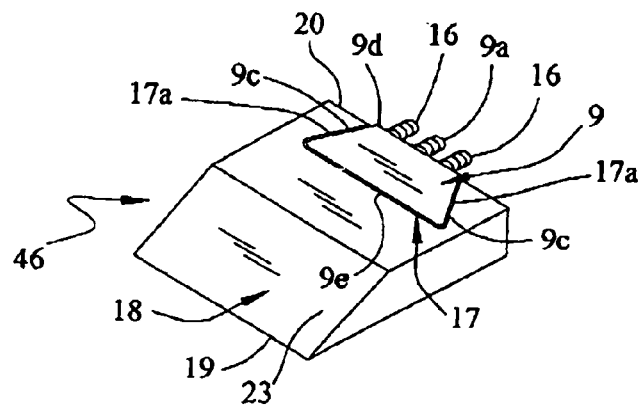
FIG. 4 is a perspective view of a typical adjustable blade of this invention, more particularly illustrating a single bevelled insert mounted in a correspondingly-shaped bevelled insert slot provided in the rear end or edge of the blade body, opposite the cutting end or edge.
Figure 5:
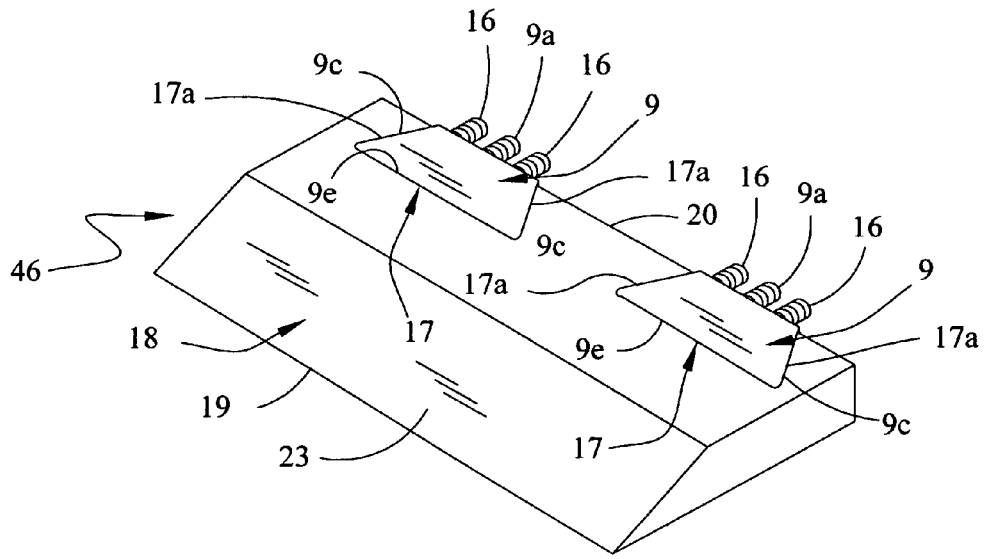
FIG. 5 is a perspective view of a elongated adjustable blade of this invention, more particularly illustrating a pair of bevelled insert seats for receiving correspondingly-shaped bevelled inserts therein.
Figure 6:
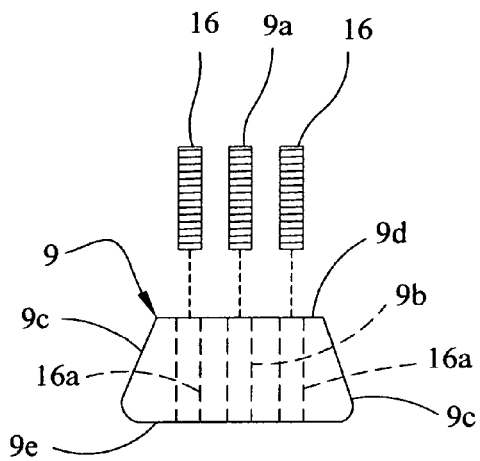
FIG. 6 is a top view of a typical bevelled insert, more particularly illustrating an insert mount screw and two adjusting screws threaded therein.

Referring now to FIGS. 1-6 of the drawings, a first preferred embodiment of the adjustable blades for wood chippers is generally illustrated by reference numeral 46. The adjustable blades 46 are adapted for attachment to a conventional chipping head 40 for a brush chipper system (not illustrated) and the chipping head 40 typically includes a generally cylindrical rotor head 41, provided with multiple longitudinal blade mount channels 42, which define a rotor head body 41a on one side of each blade mount channel 42 and a rotor head arm 41b on the opposite side of each blade mount channel 42. The rotor head 41 is traversed by a central shaft bore 43 which typically includes a key slot 44 for attaching the rotor head 41 to a rotor head drive shaft (not illustrated). As illustrated in FIGS. 3, 5 and 6, each adjustable blade 46 is typically positioned between a blade mount base 2 and a clamp plate 10 and the blade body 18 of the adjustable blade 46 has a blade bevel 23 on the front end thereof, tapering to a cutting blade edge 19 and a pair of bevelled insert seats 17 are provided in the rear edge or end thereof, opposite the cutting blade edge 19. Each of the insert seats 17 has a seat bevel 17a on each side thereof and is fitted with a bevelled insert 9 of corresponding shape and an insert mount screw 9a is threaded into a threaded mount screw opening 9b that extends through the width of the insert 9, as further illustrated in FIG. 6 of the drawings. An insert bevel 9c is provided on both sides of the insert 9 and substantially matches the seat bevel 17a, respectfully, in the corresponding insert seat 17 (FIG. 5). A pair of adjusting screws 16 are also threadably inserted in threaded adjusting screw openings 16a throughout the width of the insert 9, typically on each side of and in parallel relationship with respect to the insert mount screws 9a, respectively, (FIG. 6), for purposes which will be hereinafter further described.

As particularly illustrated in FIGS. 2 and 3 of the drawings, each adjustable blade 46 is typically held in place in the corresponding blade mount channel 42 by means of an elongated wedge 47, along with the blade mount base 2 and clamp plate 10 elements and the adjustable blade 46 is typically interposed in sandwich fashion against the clamp plate 10 and blade mount base 2, between the rotor head arm 41b and the wedge 47. The wedge 47 is, in turn, interposed between the clamp plate 10 and the rotor head body 41a. Accordingly, as illustrated in FIG. 3, the bottom surface of the blade mount base 2 engages the corresponding rotor head arm 41b of the rotor head 41, while the upper surface of the clamp plate 10 engages one side of the wedge 47 and the opposite surface of the wedge 47 engages the corresponding rotor head body 41a. The blade body 18 of each of the adjustable blades 46 is also interposed between the clamp plate lip 12 and the clamp plate flange 11, adjacent to the bottom surface 13 of the clamp plate 10 and against the blade mount base block 5, adjacent to the blade seat 7 of the blade mount base 2. The cutting blade edge 19 and at least a portion of the blade bevel 23 of each blade body 18 in the respective adjustable blades 46 are thus extended beyond the outer curvature of rotary head 41 and beyond the plate bevel 10a of the clamp plate 10, as particularly illustrated in FIGS. 2 and 3. As further illustrated in FIG. 3, each wedge 47 is typically mounted in a corresponding blade mount channel 42 by means of multiple wedge mount bolts 48, extended through respective bolt openings 47a provided in the corresponding wedge 47 and threaded into respective threaded bolt openings 47b, provided in the rotor head 41 at the bottom of each blade mount channel 42.

Figure 7:
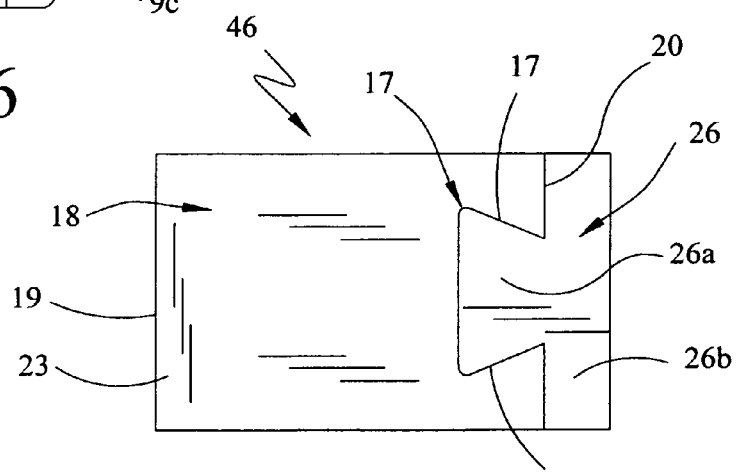
FIG. 7 is a top view of a typical adjustable blade of this invention, more particularly illustrating an alternative embodiment wherein babitt metal is poured into the insert slot while the blade is placed in a mold, and the solidified babitt metal extends rearwardly of the rear blade edge according to the mold dimensions.

Referring now to FIG. 7 of the drawings, the adjustable blades 46 can be shaped to include the insert seats 17 and then placed in a suitable mold having selected dimensions (not illustrated) known to those skilled in the art. Hot liquid babitt metal is then poured into the mold as blade babitt 26, fills the insert seat or seats 17 in the blade body 18 to define a babitt insert 26a and flows rearwardly of the blade rear edge 20 to the rear of the mold, where it solidifies to define a babitt extension 26b of selected width determined by the mold, for purposes hereinafter described.

In use, as the chipping head 40 is rotated under power applied to the rotor head drive shaft (not illustrated) in the clockwise direction in FIG. 2, the blade edges 19 of the respective adjustable blades 46 alternately and repeatably contact sticks, limbs or brush (not illustrated) fed into the brush chipper and reduce the sticks, limbs or brush to wood bits and chips in conventional fashion. Removal of the blade body 18 of the adjustable blades 46 from the chipping head 40 is facilitated as needed for sharpening or, in case of extreme wear, replacement, by unthreading the wedge mount bolts 48 from the respective bolt openings 47a of the wedge 47; removing the wedge 47 from the blade mount channel 42; and removing the respective blade body 18 from between the now loosened blade mount base 2 and the clamp plate 10, for sharpening. The metal which is lost during the sharpening of the cutting blade edge 19 of each blade body 18 is determined by measuring the resulting width of the shortened blade body 18 and in one embodiment, each of the adjusting screws 16 are then threadably withdrawn from the insert 9 a distance equal to the lost metal dimension. In another embodiment hot liquid blade babitt 26 is poured into a suitable mold and a babitt extension 26b (FIG. 7) having the lost metal dimension, solidifies in place. Accordingly, in each case, the sharpened blade body 18 can then be replaced on the rotor head 41 by repositioning the blade body 18 between the corresponding blade mount base 2 and the clamp plate 10 and again securing the wedge 47, the adjustable blades 46, the blade mount base 2 and the clamp plate 10 in the blade mount channel 42, using the wedge mount bolts 48. Accordingly, compensation for the amount of blade metal removed as the blade edge 19 is repeatedly re-sharpened is quickly and easily facilitated by backing the threaded adjusting screws 16 rearwardly or pouring a blade babitt extension 26b of suitable size, to snugly re-seat each blade body 18 in the rotor head 41 using the wedge mount bolts 48, as described above.

As further illustrated in FIGS. 4 and 5 of the drawings, one or more insert seats 17 and corresponding inserts 9 and adjusting screws 16 or blade babitts 26 can be provided in the rear edge of each blade body 18, depending upon the length of the respective adjustable blades 46.

It will be appreciated by those skilled in the art that the two embodiments of the adjustable blades 46 of this invention facilitate a significant savings in costs associated with operating various types of wood cutters and chippers. This savings is realized by enabling each blade to be sharpened and re-used many times and quickly and easily re-fitted to the rotor head 41 by simply manipulating the adjusting screws 16 outwardly of the respective inserts 9 or pouring the necessary volume of blade babitt 26 in a suitable mold containing the adjustable blades 46, to compensate for the material lost in re-sharpening of the cutting edge 19 of the blade body 18. It will be further appreciated by those skilled in the art that the adjustable blades 46 are capable of use on a variety of wood cutters and chippers of various design, including, but not limited to, log slabbers, canters, brush chippers and chips-n-saws, in non-exclusive particular.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. An adjustable blade for wood cutters comprising a blade body having a front end and a rear end spaced from said front end; a blade edge shaped in said front end and at least one bevelled insert seat provided in said rear end; a bevelled insert disposed in said bevelled insert seat; at least one mount screw threaded in said bevelled insert for selectively engaging said blade body in said bevelled insert seat and substantially immobilizing said bevelled insert in said bevelled insert seat; and at least one adjusting screw threaded in said bevelled insert for adjustable threadable extension rearwardly of said bevelled insert and said rear end of said blade body a selected distance and snugly seating said adjustable blade in the wood cutters responsive to sharpening of said blade edge of said blade body.

2. The adjustable blade for wood cutters of claim 1 wherein said at least one mount screw comprises a single mount screw threaded in said bevelled insert.

3. The adjustable blade for wood cutters of claim 1 wherein said at least one adjusting screw comprises a pair of adjusting screws disposed in said bevelled insert in spaced-apart relationship with respect to each other and with respect to said mount screw.

4. The adjustable blade for wood cutters of claim 1 wherein:
  (a) said at least one mount screw comprises a single mount screw threaded in said bevelled insert; and
  (b) said at least one adjusting screw comprises a pair of adjusting screws disposed in said bevelled insert in spaced-apart relationship with respect to each other and with respect to said mount screw.

5. The adjustable blade for wood cutters of claim 1 wherein said at least one bevelled insert seat comprises a pair of bevelled insert seats disposed in spaced-apart relationship with respect to each other in said rear end of said blade body.

6. The adjustable blade for wood cutters of claim 5 wherein said at least one mount screw comprises a single mount screw threaded in said bevelled insert.

7. The adjustable blade for wood cutters of claim 5 wherein said at least one adjusting screw comprises a pair of adjusting screws disposed in said bevelled insert in spaced-apart relationship with respect to each other and with respect to said mount screw.

8. The adjustable blade for wood cutters of claim 5 wherein:
  (a) said at least one mount screw comprises a single mount screw threaded in said bevelled insert; and
  (b) said at least one adjusting screw comprises a pair of adjusting screws disposed in said bevelled insert in spaced-apart relationship with respect to each other and with respect to said mount screw.

9. A method for adjusting the fit of wood cutter blades in a wood cutting head comprising the steps of providing at least one bevelled insert seat in one edge of the blades;
  placing a bevelled insert in the insert seat; threading at least one insert mount screw and at least one adjusting screw through the insert; tightening the insert mount screw against the bevelled insert seat to substantially immobilize the bevelled insert; and reverse manipulating the adjusting screw away from the bevelled insert to fit the wood cutter blades in the wood cutting head.

* * * * *